US009634513B2

(12) United States Patent
Tokutake (10) Patent No.: US 9,634,513 B2
(45) Date of Patent: Apr. 25, 2017

(54) METHODS AND SYSTEMS OF A BATTERY CHARGING PROFILE (71) Applicant: Sony Corporation, Tokyo (JP)

(72) Inventor: Kenji Tokutake, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 244 days.

(21) Appl. No.: 14/341,371

(22) Filed: Jul. 25, 2014

(65) Prior Publication Data

US 2016/0028249 A1  Jan. 28, 2016

(51) Int. Cl.
*H02J 7/04* (2006.01)
*H02J 7/00* (2006.01)

(52) U.S. Cl.
CPC ............ *H02J 7/0091* (2013.01); *H02J 7/008* (2013.01)

(58) Field of Classification Search
CPC ................................ H02J 7/0091; H02J 7/008
USPC ......................................................... 320/153
See application file for complete search history.

(56) References Cited

U.S. PATENT DOCUMENTS

| 7,528,346 | B2* | 5/2009 | Serra | F02D 35/025 |
| | | | | 123/210 |
| 9,128,562 | B2* | 9/2015 | Tokutake | G06F 3/0488 |
| 9,225,810 | B2* | 12/2015 | Jingushi | H04M 1/0202 |
| 9,300,882 | B2* | 3/2016 | Tokutake | H04N 5/23296 |
| 9,323,310 | B2* | 4/2016 | Ino | G06F 1/3231 |

FOREIGN PATENT DOCUMENTS

JP         2013-222642 A       10/2013

* cited by examiner

*Primary Examiner* — M'Baye Diao
(74) *Attorney, Agent, or Firm* — Oblon, McClelland, Maier & Neustadt, L.L.P.

(57) ABSTRACT

Embodiments include an electronic device, which contains circuitry configured to acquire charging parameters corresponding to a rechargeable battery of the electronic device. The circuitry is also configured to identify an operation state of one or more signal processing components of the electronic device, and estimate a first temperature profile for the electronic device based on an operation state of the one or more signal processing components. The circuitry is also configured to adjust, in multiple stages, a charging current of the rechargeable battery in response to the estimated first temperature profile and a threshold temperature for the electronic device.

18 Claims, 9 Drawing Sheets

Prior Art

FIG. 9B

METHODS AND SYSTEMS OF A BATTERY CHARGING PROFILE

BACKGROUND OF THE INVENTION

Field of the Invention

Systems and methods for charging a wireless device are described. In particular, configuring wireless devices according to battery charging profiles, in response to working conditions of the wireless devices is described.

Description of the Related Art

Electronic devices such as smartphone, tablet, personal data assistant (PDA), pager, and laptop devices include a rechargeable battery to provide power to the electronic devices in the absence of a direct wired connection to a power source. Electronic devices require recharging of the rechargeable battery, which can be frequent and inconvenient, depending upon the volume of use and the particular applications used in the electronic devices.

During charging, an electronic device is monitored as to whether it is operating in a temperature range that is considered safe for the rechargeable battery. When the safe predetermined temperature is exceeded, charging is stopped and is not resumed until the temperature of the electronic device is within the safe predetermined temperature range. However, this may require a lengthy period of time for the temperature of the electronic device to fall within the safe predetermined range. This results in the electronic device being unavailable during the cooling down phase, and possibly during an initial charging time period.

Figure 1A:
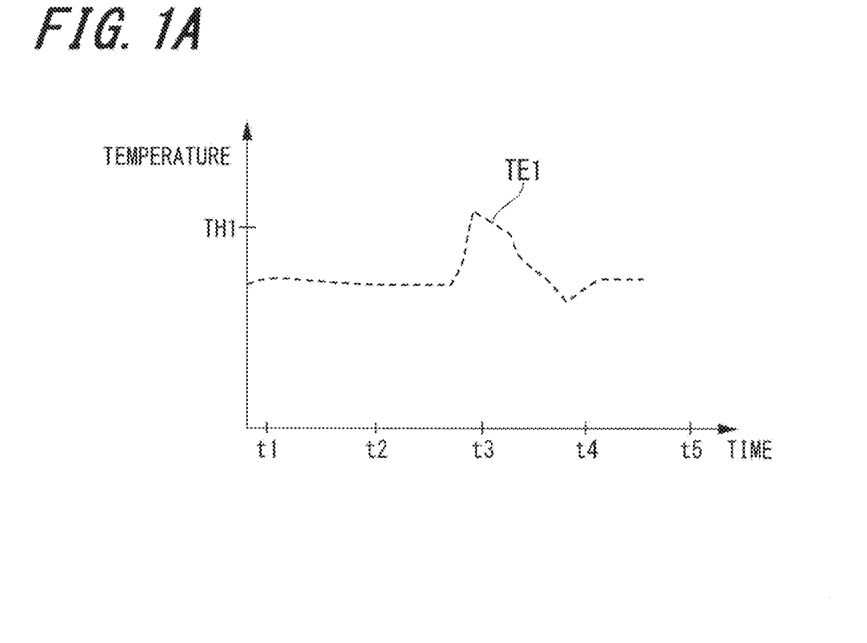
FIGS. 1A-1B illustrate a temperature and charging current of an electronic device across a time line for a conventional device.

FIG. 1A illustrates a ratio of an operating time (horizontal axis) of an electronic device and an operating temperature (vertical axis) of the electronic device. A temperature characteristic $TE_1$ is the actual measured temperature of the electronic device along the time line axis. $TH_1$ is a threshold temperature, at which point a rechargeable battery, such as a lithium ion battery should stop charging in order to avoid overheating the battery and/or the electronic device.

Figure 1B:
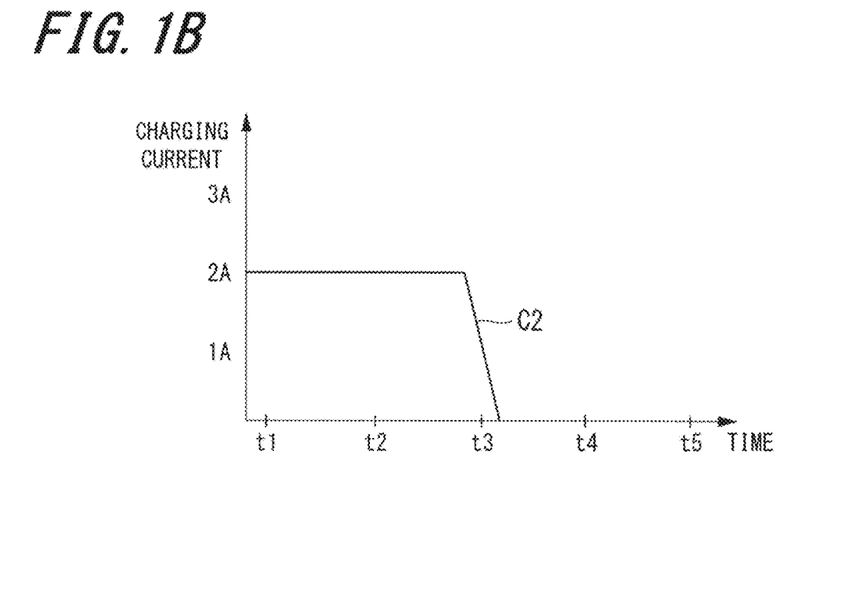

FIG. 1B illustrates a corresponding ratio of the operating time (horizontal axis) of the electronic device and a charging current (vertical axis) of the electronic device. A charging current of 2 amps (A) is applied to the rechargeable battery, although other currents could be used. As illustrated in FIG. 1A, the temperature of the electronic device during time periods $t_1$ and $t_2$ is under the threshold temperature, $TH_1$ for an applied charging current of 2 A. However, at time period $t_3$, there is an increase in the temperature of the electronic device, as illustrated in FIG. 1A, which is above the threshold temperature, $TH_1$. As a result, the charging current is set from 2 A to 0 A, illustrated as $C_2$ in FIG. 1B, and charging stops. Until the temperature of the electronic device becomes lower than $TH_1$, the charging will not resume. This could result in a lengthy recharging process before the electronic device can be used again.

SUMMARY OF THE INVENTION

Embodiments include an electronic device, which has a charging control component, configured to receive charging parameters from a charge driver and a remaining-amount monitoring driver for a rechargeable battery of the electronic device. The electronic device also includes a temperature estimation component, configured to receive thermal parameters from one or more thermal drivers for one or more signal processing components, and estimate a first temperature profile for the electronic device based on an operation state of the one or more signal processing components and a charge state of the charge driver. The electronic device also includes circuitry configured to adjust in multiple stages a charging current of the rechargeable battery in response to the estimated first temperature profile and a threshold temperature for the electronic device.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Referring now to the drawings, wherein like reference numerals designate identical or corresponding parts throughout the several views.

DETAILED DESCRIPTION OF THE PREFERRED EMBODIMENTS

Figure 2:
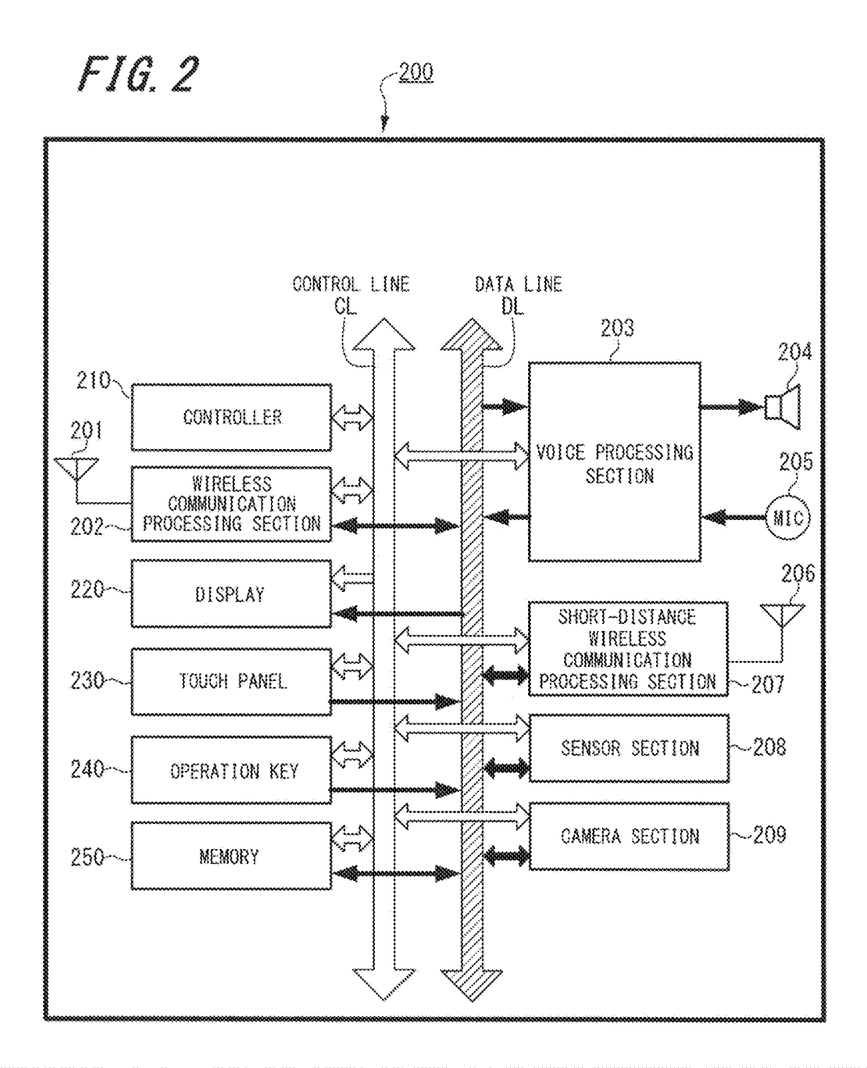
FIG. 2 illustrates a non-limiting example of a block diagram of an electronic device, according to one embodiment.

FIG. 2 illustrates a block diagram for an exemplary electronic device 200 according to certain embodiments of the present disclosure. In certain embodiments, electronic device 200 may be a smartphone. However, the skilled artisan will appreciate that the features described herein may be adapted to be implemented on other devices (e.g., a laptop, a tablet, a server, an e-reader, a camera, a navigation device, etc.). The exemplary electronic device 200 of FIG. 2 includes a controller 210, a wireless communication processor 202 connected to an antenna 201, a speaker 204, a microphone 205, and a voice processor 203.

The controller 210 may include one or more Central Processing Units (CPUs), and may control each element in the electronic device 200 to perform functions related to communication control, audio signal processing, control for the audio signal processing, still and moving image processing and control, and other kinds of signal processing. The controller 210 may perform these functions by executing instructions stored in a memory 250. Alternatively or in addition to the local storage of the memory 250, the functions may be executed using instructions stored on an external device accessed on a network, or on a non-transitory computer readable medium.

The memory 250 may include, e.g., Read Only Memory (ROM), Random Access Memory (RAM), or a memory array including a combination of volatile and non-volatile memory units. The memory 250 may be utilized as working memory by the controller 210 while executing the processes and algorithms of the present disclosure. Additionally, the memory 250 may be used for long-term storage, e.g., of image data and information related thereto.

The electronic device 200 includes a control line CL and data line DL as internal communication bus lines. Control data to/from the controller 210 may be transmitted through the control line CL. The data line DL may be used for transmission of voice data, display data, etc.

The antenna 201 transmits/receives electromagnetic wave signals between base stations for performing radio-based communication, such as the various forms of cellular telephone communication. The wireless communication processor 202 controls the communication performed between the electronic device 200 and other external devices via the antenna 201. For example, the wireless communication processor 202 may control communication between base stations for cellular phone communication.

The speaker 204 emits an audio signal corresponding to audio data supplied from the voice processor 203. The microphone 205 detects surrounding audio and converts the detected audio into an audio signal. The audio signal may then be output to the voice processor 203 for further processing. The voice processor 203 demodulates and/or decodes the audio data read from the memory 250, or audio data received by the wireless communication processor 202 and/or a short-distance wireless communication processor 207. Additionally, the voice processor 203 may decode audio signals obtained by the microphone 205.

The exemplary electronic device of FIG. 2 may also include a display 220, a touch panel 230, an operation key 240, and a short-distance communication processor 207 connected to an antenna 206. The display 220 may be a Liquid Crystal Display (LCD), an organic electroluminescence display panel, or another display screen technology. In addition to displaying still and moving image data, the display 220 may display operational inputs, such as numbers or icons, which may be used for control of the electronic device 200. The display 220 may additionally display a GUI such that a user may control aspects of the electronic device 200 and/or other devices. Further, the display 220 may display characters and images received by the electronic device 200 and/or stored in the memory 250 or accessed from an external device on a network. For example, the electronic device 200 may access a network such as the Internet, and display text and/or images transmitted from a Web server.

The touch panel 230 may include a physical touch panel display screen and a touch panel driver. The touch panel 230 may include one or more touch sensors for detecting an input operation on an operation surface of the touch panel display screen. The touch panel 230 also detects a touch shape and a touch area. Used herein, the phrase "touch operation" refers to an input operation performed by touching an operation surface of the touch panel display with an instruction object, such as a finger, thumb, or stylus-type instrument. In the case where a stylus, or the like, is used in a touch operation, the stylus may include a conductive material at least at the tip of the stylus such that the sensors included in the touch panel 230 may detect when the stylus approaches/contacts the operation surface of the touch panel display (similar to the case in which a finger is used for the touch operation).

In certain aspects of the present disclosure, the touch panel 230 may be disposed adjacent to the display 220 (e.g., laminated), or may be formed integrally with the display 220. For simplicity, the present disclosure assumes the touch panel 230 is formed integrally with the display 220 and therefore, examples discussed herein may describe touch operations being performed on the surface of the display 220 rather than the touch panel 230. However, the skilled artisan will appreciate that this is not limiting.

For simplicity, the present disclosure assumes the touch panel 230 is a capacitance-type touch panel technology. However, it should be appreciated that aspects of the present disclosure may easily be applied to other touch panel types (e.g., resistance type touch panels) with alternate structures. In certain aspects of the present disclosure, the touch panel 230 may include transparent electrode touch sensors arranged in the X-Y direction on the surface of transparent sensor glass.

The touch panel driver may be included in the touch panel 230 for control processing related to the touch panel 230, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger, is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 230 may detect a position of a user's finger around an edge of the display panel 220 (e.g., gripping a protective case that surrounds the display/touch panel). Signals may be transmitted by the touch panel driver, e.g., in response to a detection of a touch operation, in response to a query from another element, based on timed data exchange, etc.

The operation key 240 may include one or more buttons or similar external control elements, which may generate an operation signal based on a detected input by the user. In addition to outputs from the touch panel 230, these operation signals may be supplied to the controller 210 for performing related processing and control. In certain aspects of the present disclosure, the processing and/or functions associated with external buttons and the like may be performed by the controller 210 in response to an input operation on the touch panel 230 display screen rather than the external button, key, etc. In this way, external buttons on the electronic device 200 may be eliminated in lieu of performing inputs via touch operations, thereby improving water-tightness.

The antenna 206 may transmit/receive electromagnetic wave signals to/from other external apparatuses, and the short-distance wireless communication processor 207 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 207.

The electronic device 200 may include a motion sensor 208. The motion sensor 208 may detect features of motion (i.e., one or more movements) of the electronic device 200. For example, the motion sensor 208 may include an accelerometer, a gyroscope, a geomagnetic sensor, a geo-location sensor, etc., or a combination thereof, to detect motion of the electronic device 200. In certain embodiments, the motion sensor 208 may generate a detection signal that includes data representing the detected motion. For example, the motion sensor 208 may determine a number of distinct movements in a motion (e.g., from start of the series of movements to the stop, within a predetermined time interval, etc.), a number of physical shocks on the electronic device 200 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 210, whereby further processing may be performed based on data included in the detection signal.

The electronic device 200 may include a camera component 209, which includes a lens and shutter for capturing photographs of the surroundings around the electronic device 200. The images of the captured photographs can be displayed on the display panel 220. A memory component saves the captured photographs. The memory component may reside within the camera component 209, or it may be part of the memory 250.

Figure 3:
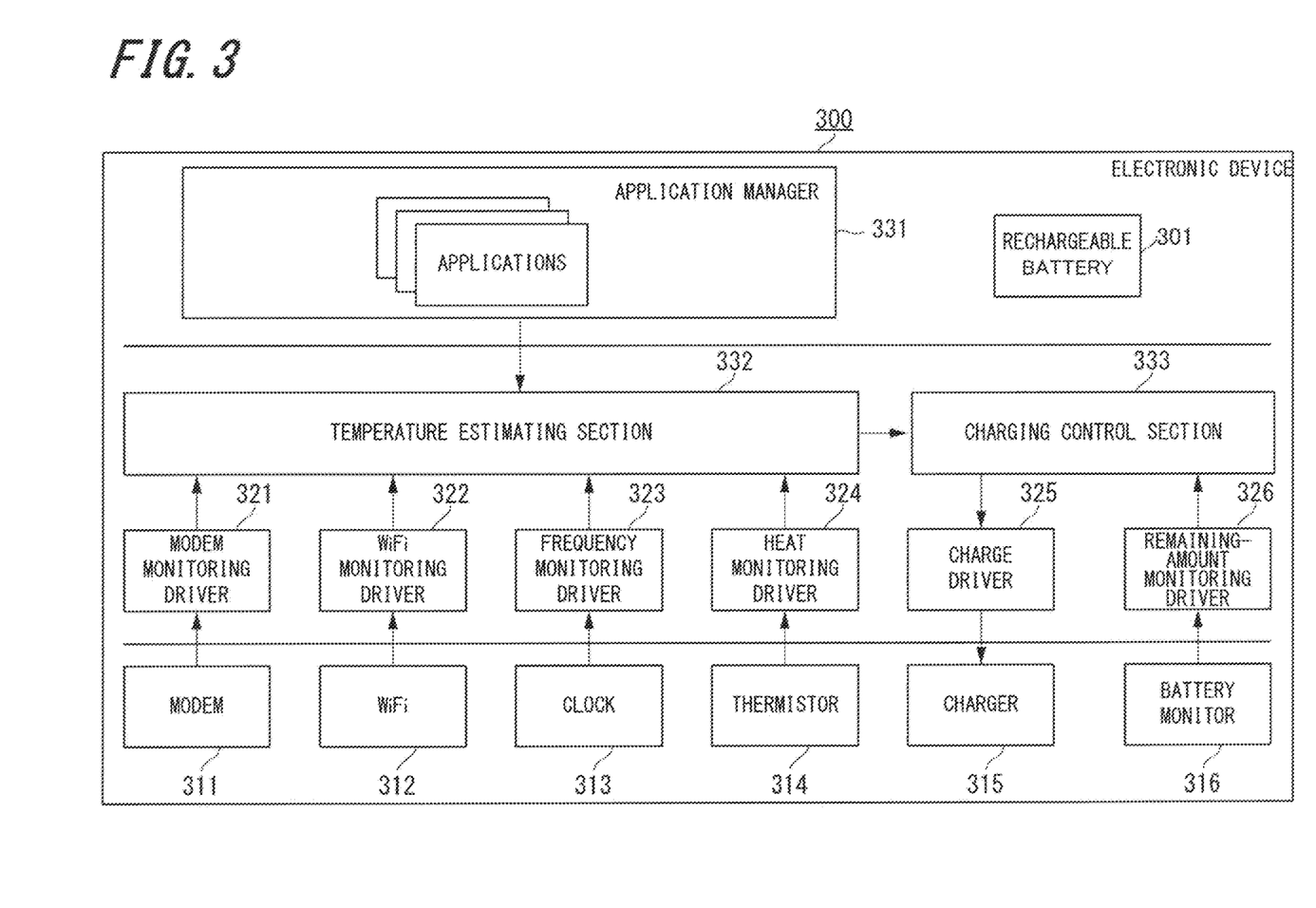
FIG. 3 illustrates a structural diagram of an exemplary electronic device, according to one embodiment.

FIG. 3 illustrates a structural diagram of an electronic device 300 as it relates to a battery component and battery-related components. The electronic device 300 contains a rechargeable battery 301, such as a lithium ion battery. However, other rechargeable batteries are contemplated by embodiments described herein. The rechargeable battery 301 is not drawn to scale with respect to the electronic device 300. The actual size of the rechargeable battery 301 will vary with the type of electronic device 300 and its intended applications.

A charging current is supplied by a charger 315 to the rechargeable battery 301. A charge driver 325 determines the current level with which to charge the rechargeable battery 301. An embodiment of current levels includes four different levels of 1 A, 1.5 A, 2 A, and 3 A. A 3 A charging current is a level in which to execute a quick charge of the rechargeable battery 301. When a quick charge is not possible or recommended, a charging current of 1 A-2 A can be used. However, other ranges of current levels can be used, which may depend on the type and/or size of electronic device 300 and its intended applications. The charge level of the rechargeable battery 301 is monitored by a battery monitor 316. Charge level data obtained by the battery monitor 316 is forwarded to a remaining-amount monitoring driver 326, which determines when the rechargeable battery 301 is in need of charging. Data pertaining to the working condition of the rechargeable battery 301 monitored by the remaining-amount monitoring driver 326 is forwarded to a charging control component 333. The charging control component 333 controls charging of the rechargeable battery 301 by the charge driver 325.

The electronic device 300 contains a modem component 311, a Wi-Fi communication component 312, and signal processing components, such as a clock component 313. The modem component 311 modulates data transmitted from the electronic device 300 and demodulates data input into the electronic device 300. The Wi-Fi communication component 312 communicates wirelessly according to Wi-Fi specifications. The clock component 313 controls the electronic device 300. A modem monitoring driver 321 monitors a working condition of the modem component 311, and a Wi-Fi communication monitoring driver 322 monitors a working condition of the Wi-Fi communication component 312. A frequency monitoring driver 323 monitors a working condition of the clock component 313. Although not illustrated, the electronic device 300 is equipped with a display and/or a camera, as well as respective monitoring drivers.

The electronic device 300 also contains a thermistor component 314, which detects a temperature inside of the electronic device 300. Temperature data obtained by the thermistor component 314 is forwarded to a heat monitoring driver 324. Data of the working condition of each processing component monitored by monitoring drivers 321-323 and temperature data monitored by the heat monitoring driver 324 is forwarded to a temperature estimation component 332.

The electronic device 300 also contains an application manager 331, which manages an execution condition of one or more applications. Data of the execution condition of an application in the application manager 331 is supplied to the temperature estimation component 332. The temperature estimation component 332 estimates the change in temperature of the electronic device 300, based upon the supplied data. Consideration of the working condition of each signal processing component, the running state of each application, and the charge condition of the rechargeable battery 301 are all considered by the temperature estimation component 332. When the charge driver 325 determines the charging current of the rechargeable battery 301, the charging control component 333 forwards the temperature estimated by the temperature estimation component 332 to the charge driver 325. When the estimated temperature exceeds a predetermined threshold value, the charging control component 333 optimizes a charging current, such that a threshold value is not exceeded.

Figure 4:
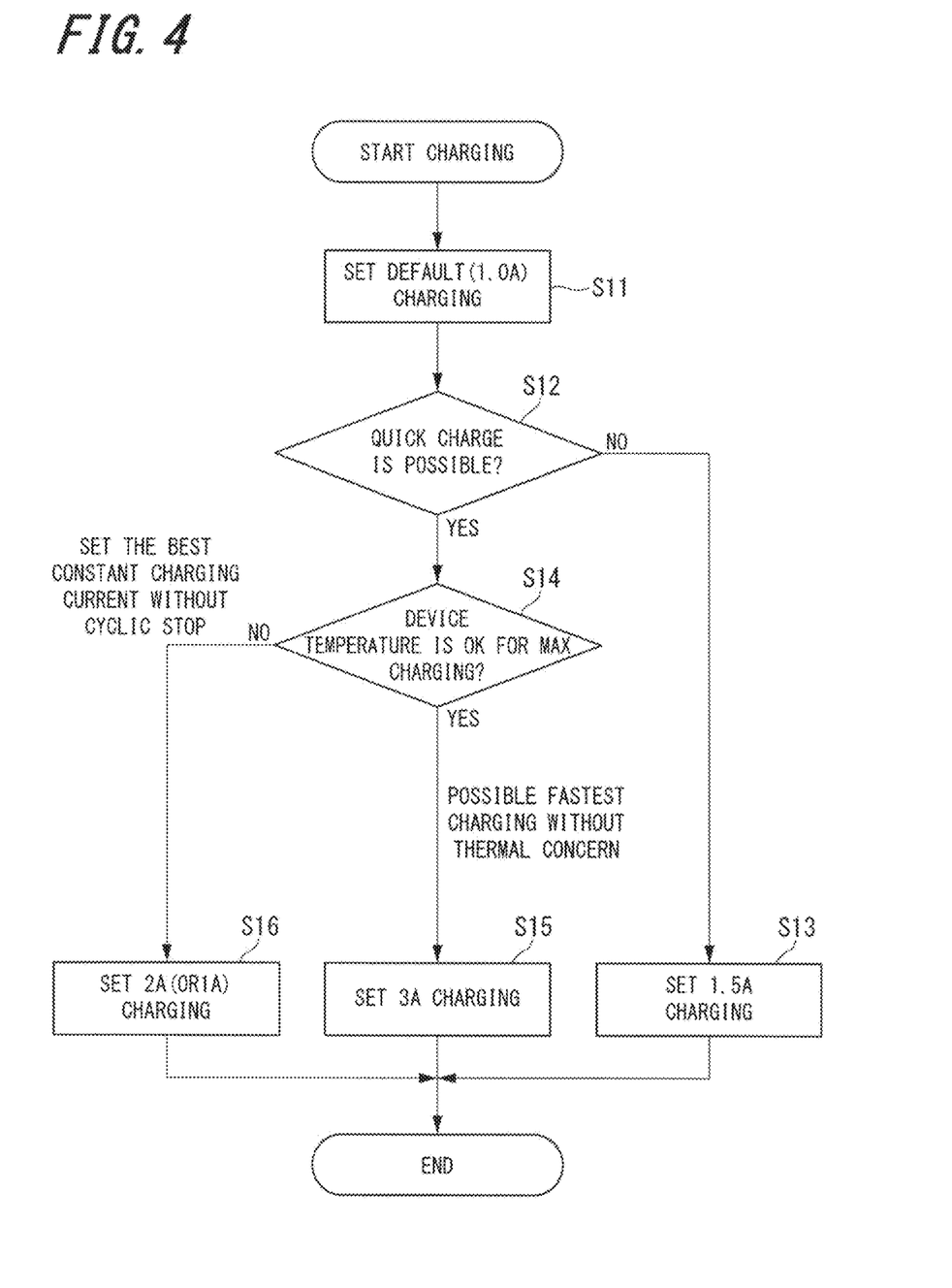
FIG. 4 is an algorithm for optimizing the charging current, according to one embodiment.

FIG. 4 is an algorithm that illustrates the charging control component 333 optimizing the charging current of the rechargeable battery 301. In step S11, the charging control component 333 sets a charging current to 1 A at the start time of charging the rechargeable battery 301. The 1 A charging current is the smallest electric current value of the four charging levels, 1 A-3 A. However, other ranges of current can be established, depending upon the size and type of the device and its intended applications.

In step S12, the charging control component 333 monitors the battery voltage, temperature, and other parameters while the rechargeable battery 301 is being charged by the 1 A charging current. The charging control component 333 determines whether a quick charge is possible. The charging control component 333 monitors battery parameters, such as the battery voltage, temperature, and current charging conditions, and determines a recommended or safe temperature range in which the battery can operate. An example of a quick charge is charging at a level of 3 A. When it is determined that a quick charge is not possible, the charging control component 333 moves to step S13 and sets the charging current to 1.5 A, where charging of the rechargeable battery 301 proceeds. When it is determined that a quick charge is possible in step S12, the process proceeds to step S14.

In step S14, the charging control component 333 determines whether the temperature of the electronic device 300, detected by the thermistor component 314 is in a temperature range advisable for a quick charge. The temperature of the electronic device 300 can be determined by the monitoring drivers of the components, such as the modem monitoring driver 321, the WiFi monitoring driver 322, the frequency monitoring driver 323, and the heat monitoring driver 324. These components are addressed in the algorithm illustrated in FIG. 5. The thermal effects of components, such as the camera, display, and WiFi are also illustrated in the thermal profiles of FIGS. 6A-6C. When the temperature is in a range in which a quick charge is possible, the charging control component 333 proceeds to step S15 and sets a charging current to 3 A, which is the largest value within the charging range of 1 A-3 A. When it is determined in step S14 that the temperature of the electronic device 300 is not in a temperature range in which a quick charge is possible, the charging control component 333 proceeds to step S16. At step S16, the charger 315 charges the rechargeable battery 301 according to a temperature determined by the temperature estimation component 332 within the charging current from 1 A to 2 A. When conditions such as the temperature change after selecting an initial charging current in any of steps S13, S15, or S16, the charging control component 333 adjusts the charging current accordingly.

Figure 5:
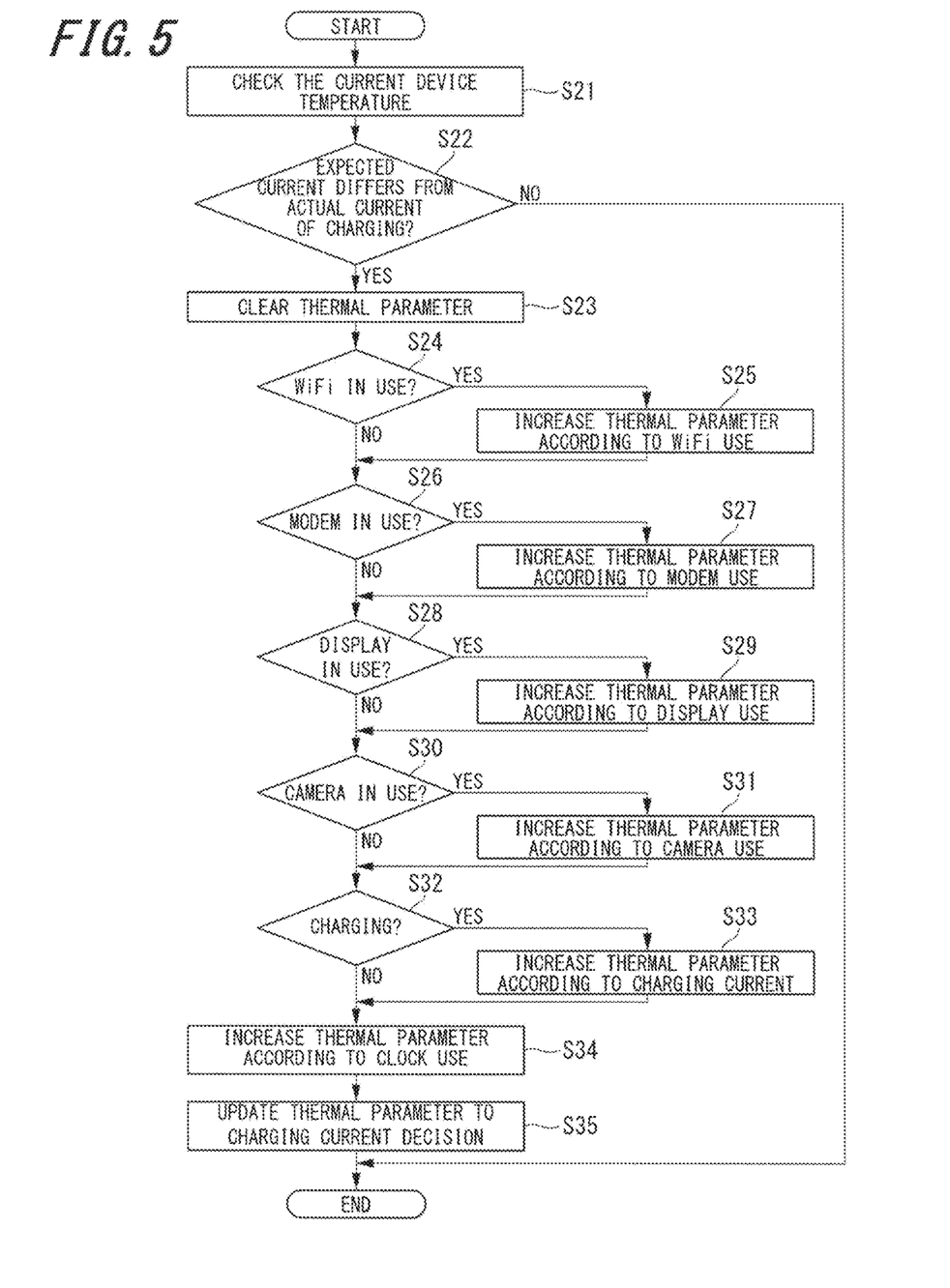
FIG. 5 is an algorithm that illustrates an optimization of a charging current, according to one embodiment.

FIG. 5 is an algorithm that illustrates an optimization of a charging current. In step S21, a current temperature of the electronic device 300 is determined by the temperature estimation component 332, which was detected by the thermistor component 314. The temperature estimation component 332 determines in step S22 whether there is a difference between a charging current anticipated to be set by the charging control component 333 and the actual charging current. When the actual charging current is the same as the charging current anticipated by the charging control component 333, there is no temperature adjustment performed. As an example, the actual charging current may be undergoing a quick charge at 3 A, and the charging control component 333 determines that the electronic device 300 is still within acceptable conditions for a quick charge. When the temperature estimation component 332 determines in step S22 a difference between an anticipated charging current and the actual charging current, the process proceeds to step S23, where the temperature estimation component 332 clears the value of the temperature parameter previously set.

In step S24, the temperature estimation component 332 determines whether the Wi-Fi communication component 312 is operating. When the Wi-Fi communication component 312 is operating, the process proceeds to step S25, where the temperature estimation component 332 sets the value of the temperature parameter according to the working condition of the Wi-Fi communication component 312, and continues to step S26. When the Wi-Fi communication component 312 is not in use, the process proceeds to step S26. At step S26, the temperature estimation component 332 determines whether the modem component 311 is operating. When the modem component 311 is operating, the process proceeds to step S27, where the temperature estimation component 332 sets the value of the temperature parameter according to the working condition of the modem component 311, and the process continues to step S28. When the modem component 311 is not in use, the process proceeds to step S28.

In step S28, the temperature estimation component 332 determines whether a display is showing an image. When the display is showing an image, the process proceeds to step S29, where the temperature estimation component 332 sets the value of the temperature parameter according to the condition of the display, and continues to step S30. When the display is not showing, the process proceeds to step S30. In step S30, the temperature estimation component 332 determines whether a camera is operating. When the camera is operating, the process proceeds to step S31, where the temperature estimation component 332 sets the value of the temperature parameter according to the working condition of the camera, and continues to step S32. When the camera is not in use, the process proceeds to step S32. In step S32, the temperature estimation component 332 determines whether the charger 315 is performing a charging. When the charger 315 is performing a charging function, the process proceeds to step S33, where the temperature estimation component 332 sets the value of the temperature parameter according to the execution condition of charging, and continues to step S34. When charging is not in execution, the process proceeds to step S34.

In step S34, the temperature estimation component 332 sets the value of the temperature parameter according to the clock generation condition of the clock component 313 of the electronic device 300. In step S35, the temperature estimation component 332 estimates the amount of heat emission of the electronic device 300 from the sum total values of the temperature parameters set in steps S25, S27, S29, S31, S33, and S34. The temperature estimation component 332 estimates how much the electronic device 300 increases in temperature for a set time period, for example every minute. The temperature parameter is updated accordingly.

Figure 6A:
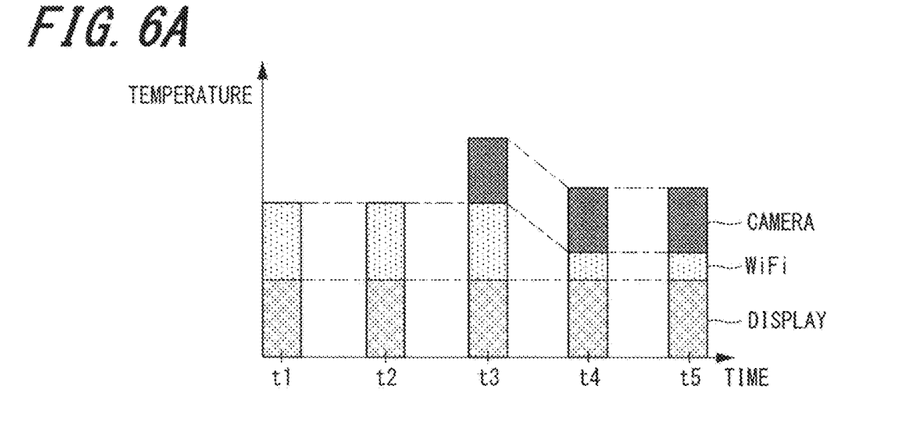
FIGS. 6A-6C are graphs of temperature and charging current versus time of an exemplary electronic device, according to one embodiment.
Figure 6B:
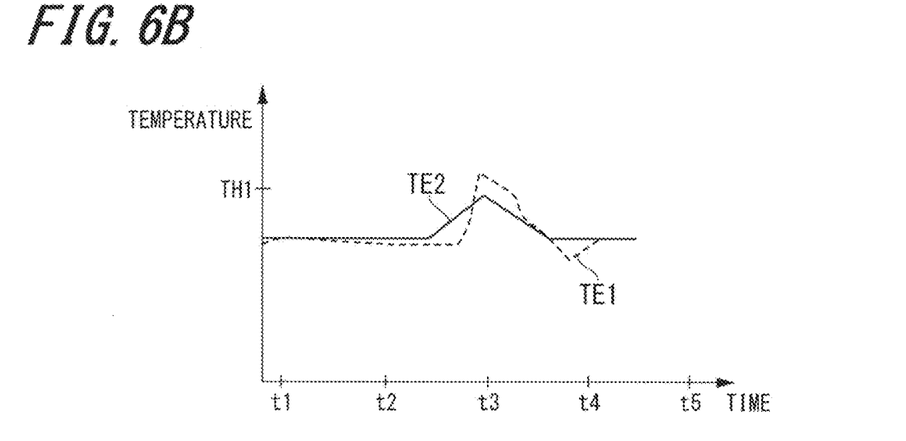
Figure 6C:
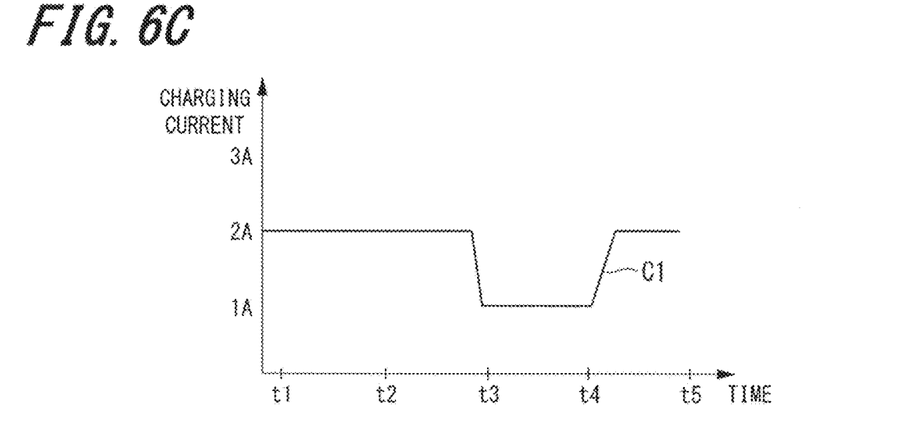

FIGS. 6A-6C illustrate an example in which the charging control section 333 controls a charging current based on the temperature estimated by the temperature estimation component 332. FIGS. 6A-6B illustrate time on the horizontal axis and temperature on the vertical axis. FIG. 6A illustrates the working condition of each processing component of the electronic device 300, including a camera component, a WiFi communication component, and a display component. For simplicity, the heat generation generated by the clock component 313 and its associated charging characteristic have been omitted from FIGS. 6A-6C.

FIG. 6B illustrates a temperature characteristic $TE_1$, which is an actual measured temperature of the electronic device 300. A temperature characteristic $TE_2$ is a temperature estimated by the temperature estimation component 332, which is based on the working condition of each of the processing components illustrated in FIG. 6A. A threshold value $TH_1$ is the temperature at which the charger 315 stops charging the rechargeable battery 301.

In the example illustrated in FIG. 6A, a WiFi communication component and a display component are working at times $t_1$ and $t_2$. During this time, the display component is displaying an image and the WiFi communication component is communicating wirelessly. The temperature of the electronic device 300 is primarily determined from the working condition of the display component and the Wi-Fi communication component. FIG. 6C illustrates time on the horizontal axis and charging current on the vertical axis, where the rechargeable battery 301 is being charged at a current level of 2 A during times $t_1$ and $t_2$.

At time $t_3$, the camera component begins working, which causes an associated increase in temperature. FIG. 6B illustrates that the estimated temperature $TE_2$ increases in temperature at time $t_3$, which exceeds the threshold temperature $TH_1$. The measured temperature $TE_1$ also increases in the vicinity of time $t_3$. As a result of the temperature increase above the threshold temperature $TH_1$, the charging control component 333 of the electronic device 300 changes the charging current of the rechargeable battery 301 from 2 A to 1 A, as illustrated in FIG. 6C.

FIG. 6A illustrates at time $t_4$, the Wi-Fi communication component changes to a low working condition. Therefore, heat generated by the Wi-Fi communication component is reduced, and the estimated temperature $TE_2$ of the electronic device 300 is reduced below the threshold value $TH_1$, as illustrated in FIG. 6B. As a result, the charging control component 333 of the electronic device 300 adjusts the charging current of the rechargeable battery 301 from 1 A to 2 A, illustrated by $C_1$ in the graph of FIG. 6C.

FIGS. 6A-6C illustrate that temperature changes to the electronic device 300 initiate changes to the charging current of the rechargeable battery 301. This provides an electronic device 300 that operates at multiple charging currents in response to multiple heat production levels. Therefore, most instances of overheating above the temperature $TH_1$ can be avoided by adjusting the applied current level of the electronic device 300. As a result, the electronic device 300 can operate continuously with minimal interruptions due to overheating. A high charging current, such as 3 A will be applied to the rechargeable battery 301 as much as possible within a temperature range below $TH_1$.

In the example illustrated in FIGS. 6A-6C, a charging current was adjusted to prevent the temperature of the electronic device 300 from exceeding the threshold value $TH_1$. Another embodiment includes a combination of adjusting the charging current and adjusting the working condition of a signal processing component in the electronic device 300.

Figure 7:
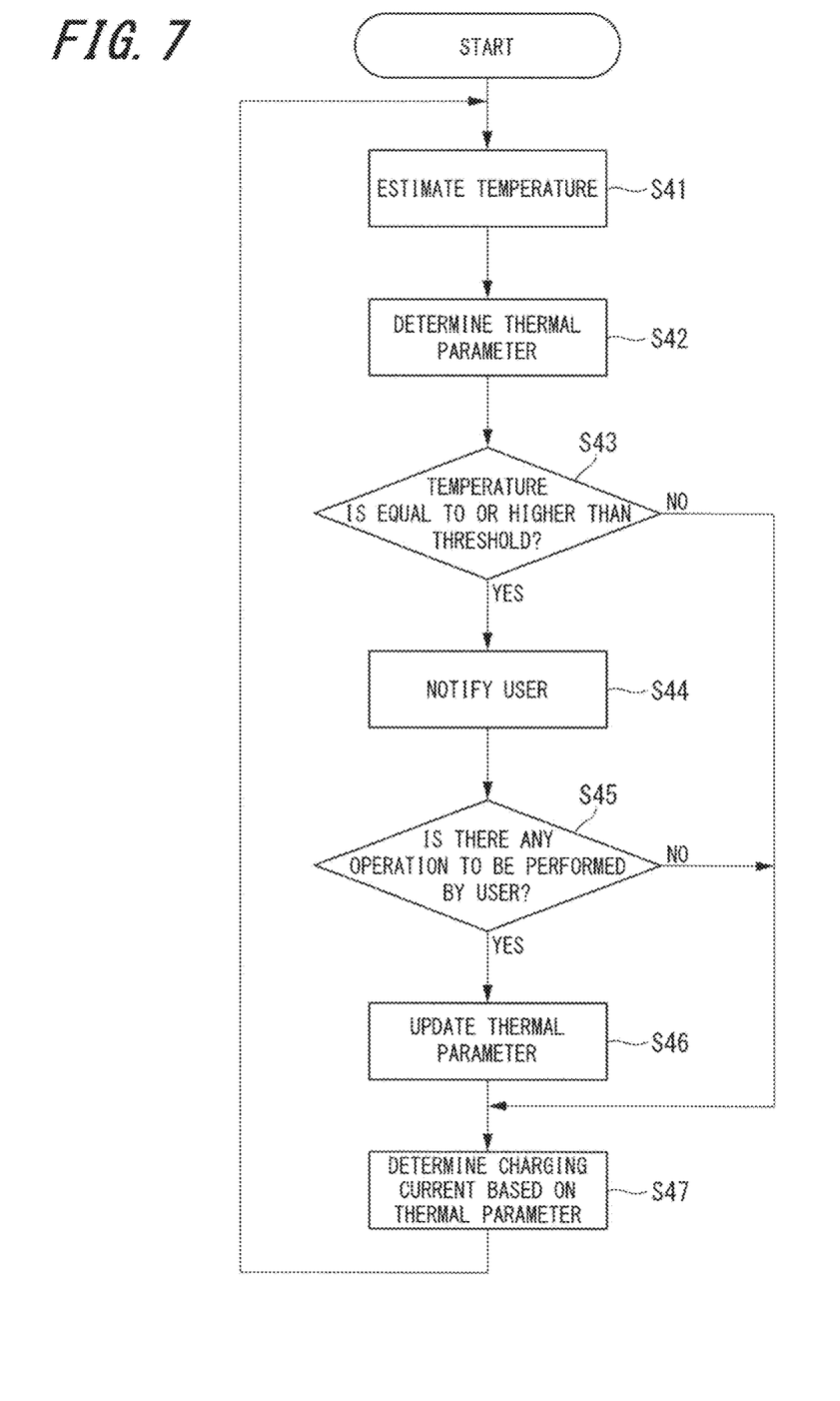
FIG. 7 is a notification algorithm, according to one embodiment.

FIG. 7 is an algorithm that notifies a user when the temperature of the electronic device 300 is high, and one of the working functions is stopped by the user to allow the temperature of the electronic device 300 to decrease within a safer operating temperature range. In step S41, the temperature estimation component 332 estimates the amount of heat emission according to the working condition of each component of the electronic device 300. In step S42, the temperature estimation component 332 determines the temperature parameter according to the working condition of each component of the electronic device 300, such as the WiFi communication component, the modem component, the display component, and the camera component.

In step S43, the temperature estimation component 332 determines whether the temperature determined by the temperature parameter of step S42 is more than a threshold value $TH_1$. When the temperature is more than the threshold value $TH_1$, the process proceeds to step S44, and when the temperature is lower than the threshold value $TH_1$, the process proceeds to step S47. When the temperature is greater than the threshold value $TH_1$, the temperature estimation component 332 indicates on the display component a notification to a user that the temperature is increasing above a recommended temperature in step S44. The display component will also instruct the user to stop one of the operations, simultaneously with the notification of an increase in temperature. For example, a display component may display the message, "the temperature of the electronic device is rising—please click the stop camera button." Other such messages to instruct the user of a desired action are contemplated by embodiments described herein.

After displaying the message in step S44, the temperature estimation component 332 determines whether a user operation has been received in step S45. When a user's operation has been received, the process proceeds to step S46. When no user operation has been received, the process proceeds to step S47. In step S46, the temperature estimation component 332 creates a new temperature parameter that reflects the signal processing component in which operation was stopped by the user. In step S47, the temperature estimation component 332 calculates the estimated temperature of the electronic device 300, based on the temperature parameter determined in step S42, or the temperature parameter updated in step S46. The charging control component 333 determines a charging current from a comparison of the estimated temperature of the electronic device 300 and the threshold value $TH_1$. After a charging current has been determined in step S47, the temperature estimation component 332 returns to the process of step S41.

Figure 8A:
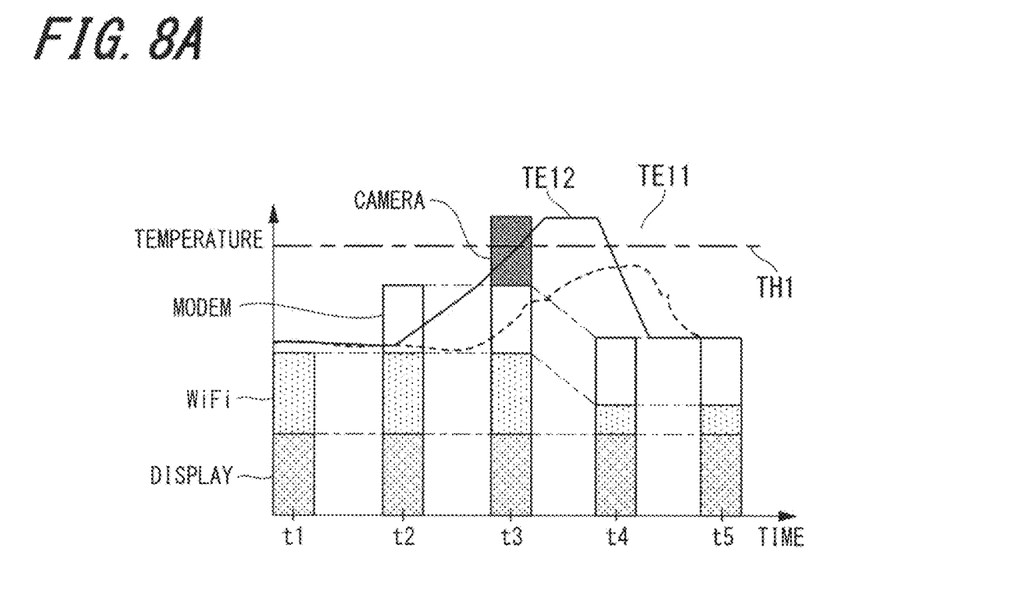
FIGS. 8A-8B are graphs of temperature and charging current versus time of an exemplary electronic device, according to one embodiment.
Figure 8B:
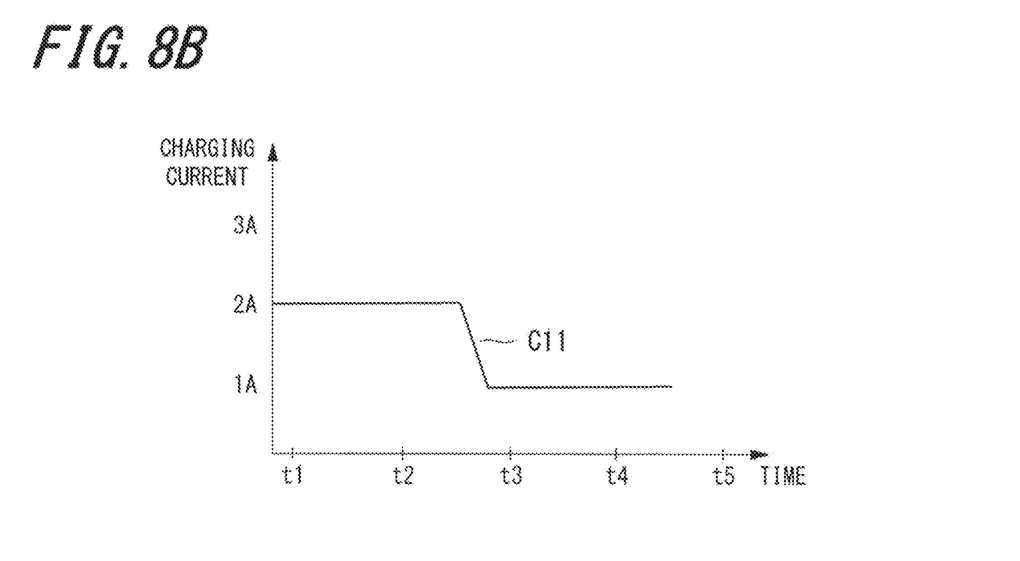

FIGS. 8A-8B are graphs that illustrate an example of the working condition of the modem component, the WiFi communication component, and the display component of electronic device 300 during a temperature change of the electronic device 300. For simplicity, the clock component and its associated charging component have been omitted from FIGS. 8A-8B. The working condition of the signal processing components of the electronic device 300 is changed based on the temperature estimated by the temperature estimation component 332. FIG. 8B illustrates an associated change in applied charging current in response to the temperature changes illustrated in FIG. 8A.

In FIG. 8A, temperature characteristic $TE_{11}$ is an actual measured temperature of the electronic device 300. Temperature characteristic $TE_{12}$ is a temperature estimated by the temperature estimation component 332, based on the working condition of each signal of a processing component. Threshold value $TH_1$ is a temperature at which the rechargeable battery 301 stops being charged. FIG. 8B illustrates the change in the charging current supplied to the rechargeable battery 301, supplied by the charger 315.

As illustrated in FIG. 8A at time $t_1$, the temperature of the electronic device 300 is primarily determined from the working condition of the display component and the Wi-Fi communication component. The charging current of the rechargeable battery 301 is 2 A during time $t_1$, as illustrated in FIG. 8B.

At time $t_2$, the modem component has started operating, as illustrated in FIG. 8A. An associated estimated temperature $TE_{12}$ increases upon modem operation. At time $t_3$, the camera component begins operating, and an estimated temperature $TE_{12}$ increases further. At this point, the estimated temperature $TE_{12}$ has risen above the threshold temperature $TH_1$. In response to this, a message is displayed on the display component that the electronic device 300 has exceeded a recommended operating temperature, and requests the user to stop operation of one or more working functions. At the same time as displaying the message, the charging control component 333 reduces the applied current from 2 A to 1 A, as illustrated by $C_{11}$ in FIG. 8B. At time $t_4$, the user ends operation of the camera component and also reduces the working function of the WiFi communication component. In response to these actions, the operating temperature of the electronic device 300 is lowered below the threshold temperature $TH_1$, as illustrated by $TE_{11}$.

Figure 9A:
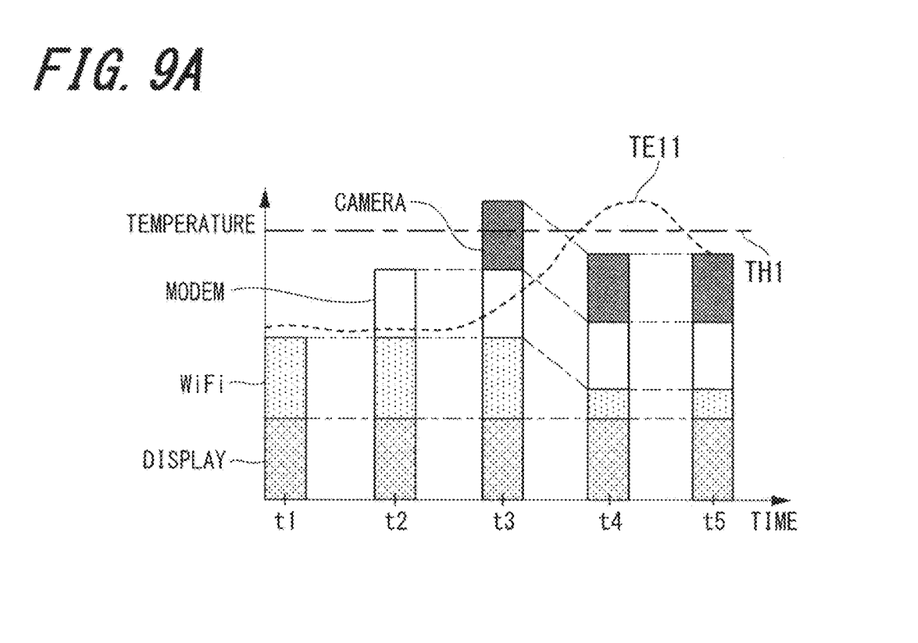
FIGS. 9A-9B are graphs of temperature and charging current versus time of an exemplary electronic device, according to one embodiment.
Figure 9B:
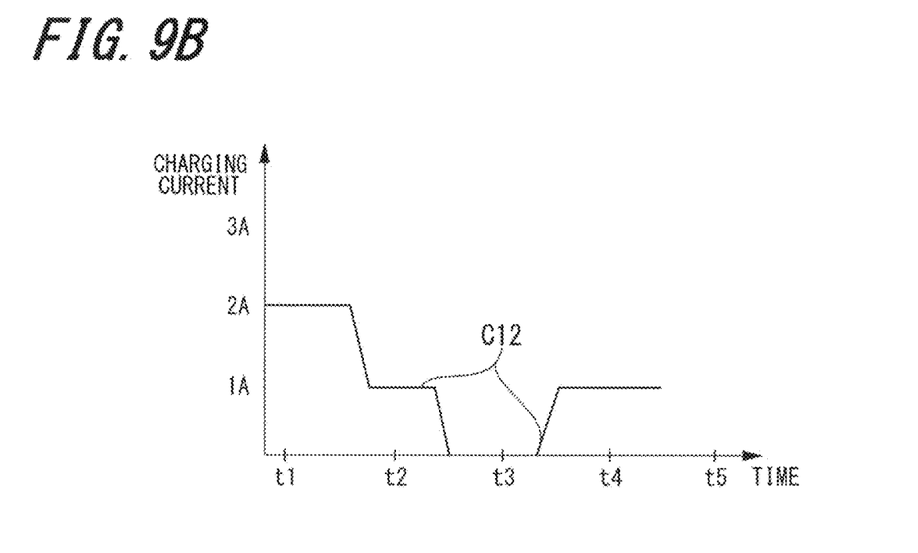

FIGS. 9A-9B illustrate an example similar to the example illustrated in FIGS. 8A-8B, except a working condition of a signal processing component of the electronic device 300 does not change. As illustrated in FIG. 9A, a display component and a WiFi communication component are operating at time $t_1$. At time $t_2$, a modem component begins operating, which causes the operating temperature of the electronic device 300 to increase, as illustrated by $TE_{11}$. In response, the charging control component 333 adjusts the supplied charging current from 2 A to 1 A. At time $t_3$, a camera component begins operating, which further increases the operating temperature of the electronic device 300 above the threshold temperature $TH_1$.

In this example, a user of the electronic device 300 did not eliminate one or more of the operating functions, even though a message may have been displayed to the user to do so in response to the elevated temperature of the electronic device 300. As a result, charging of the electronic device 300 by the charger 315 stops, as illustrated by $C_{12}$ in FIG. 9B. At time $t_4$, a working condition of the Wi-Fi communication component is lowered, such that the temperature of the electronic device 300 decreases below the threshold value $TH_1$. In response thereto, charging by the charger 315 resumes at a level of 1 A.

The algorithm illustrated in FIG. 7 and the examples illustrated in FIGS. 8A-8B and 9A-9B describe displaying a message to the user of an increased temperature of the electronic device 300 above a recommended temperature, and providing a user an option to eliminate or decrease the working function of one or more operations. Another embodiment provides an automatic cancellation of a working function in order to decrease the temperature of the electronic device 300. This embodiment may also include a countdown warning of an impending cancellation of a working function, such as 1-5 minutes. Another embodiment provides an automatic lowering of functional capacity of a working function in the absence of a user-specified response to lower or eliminate a working function. An example includes lowering the transfer rate of a wireless communication, or increasing the data transmission period to transfer data periodically instead of continuously.

Conventional methods measure the amount of heat after generation of the heat. As a result, the thermal profile is already too high by the time it is measured, and in many cases, the only solution is a charge stop. It is possible to shorten the measurement period, but again, the measurement still occurs after the heat is already produced and may require a charge stop. In contrast, embodiments described herein minimize or eliminate a charge stop by detecting that a heat increase is likely to occur, and in response, adjust a thermal measurement profile accordingly.

Numerous modifications and variations of the present invention are possible in light of the above teachings. The embodiments described with reference to the drawings may be practiced individually or in any combination thereof. It is therefore to be understood that within the scope of the appended claims, the invention may be practiced otherwise than as specifically described herein.

The functions, processes, and algorithms described herein may be performed in hardware or software executed by hardware, including computer processors and/or programmable processing circuits configured to execute program code and/or computer instructions to execute the functions, processes, and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) An electronic device comprising: circuitry configured to acquire charging parameters corresponding to a rechargeable battery of the electronic device; identify an operation state of one or more signal processing components of the electronic device; estimate a first temperature profile for the electronic device based on an operation state of the one or more signal processing components; and adjust, in multiple stages, a charging current of the rechargeable battery in response to the estimated first temperature profile and a threshold temperature for the electronic device.

(2) The electronic device according to (1), wherein the charging control component is configured to notify a user that a temperature of the first temperature profile has exceeded the threshold temperature.

(3) The electronic device according to (1) or (2), wherein the temperature estimation component is configured to estimate a second temperature profile when an operation state of at least one of the signal processing components is changed to a lower heat generation state after the notification.

(4) The electronic device according to any one of (1) to (3), wherein the charging control component is configured to determine a revised charging current for the rechargeable battery based on the estimated second temperature profile.

(5) The electronic device according to any one of (1) to (4), wherein the charging control component is configured to further notify the user to end operation of one of the signal processing components in operation.

(6) The electronic device according to any one of (1) to (5), wherein the charging control component is configured to change an operation state of one of the signal processing components to an operation which generates less heat when the estimated first temperature profile exceeds the threshold temperature.

(7) The electronic device according to any one of (1) to (6), wherein the one or more signal processing components include one or more of a modem component, a WiFi component, a clock component, a thermistor component, a camera component, or a display component.

(8) The electronic device according to any one of (1) to (7), wherein the remaining-amount monitoring driver is configured to determine when the rechargeable battery needs to be charged based on charging current level data received from a battery monitor.

(9) The electronic device according to any one of (1) to (8), further comprising an application manager.

(10) The electronic device according to any one of (1) to (9), wherein the temperature estimation component is configured to estimate a change in temperature of the electronic device based on execution condition data from the application manager.

(11) The electronic device according to any one of (1) to (10), wherein the temperature estimation component is configured to consider a working condition of the signal processing components, a running state of each application, and a charge condition of the rechargeable battery.

(12) The electronic device according to any one of (1) to (11), wherein the charging control component is configured to forward the first temperature profile estimated by the temperature estimation component to the charge driver.

(13) The electronic device according to any one of (1) to (12), wherein the charging control component is configured to adjust a charging current to avoid exceeding the threshold temperature of the electronic device based on the estimated first or second temperature profiles from the temperature estimation component.

(14) The electronic device according to any one of (1) to (13), wherein the charging control component is configured to close an application to avoid exceeding the threshold temperature.

(15) The electronic device according to any one of (1) to (14), wherein the charging control component is configured to lower the charging current to avoid exceeding the threshold temperature.

(16) The electronic device according to any one of (1) to (15), wherein the charging control component is configured to resume or increase the charging current when the estimated first or second temperature profiles fall below the threshold temperature.

(17) The electronic device according to any one of (1) to (16), wherein the charging control component is configured to determine when a quick charge is possible.

(18) The electronic device according to any one of (1) to (17), wherein the charging current ranges from one to three amps.

(19) A method of managing a thermal parameter of an electronic device, includes estimating a temperature profile of the electronic device based on an operation state of a plurality of signal processing components and a charge state of a charging component; determining a difference between an expected charging current from the estimated temperature profile and an actual charging current of a rechargeable battery of the electronic device; increasing a thermal parameter according to the respective plurality of signal processing components in use; estimating an amount of heat emission of the electronic device from a sum total value of the thermal parameter; and adjusting a charging current profile for the rechargeable battery based on the sum total value of the thermal parameter and a threshold temperature value for the electronic device.

(20) A non-transitory computer readable medium having instructions stored thereon that when executed by one or more processors cause an electronic device to perform a method comprising: estimating a temperature profile of the electronic device based on an operation state of a plurality of signal processing components and a charge state of a charging component; determining a difference between an expected charging current from the estimated temperature profile and an actual charging current of a rechargeable battery of the electronic device; increasing a thermal parameter according to the respective plurality of signal processing components in use; estimating an amount of heat emission of the electronic device from a sum total value of the thermal parameter; and adjusting a charging current profile for the rechargeable battery based on the sum total value of the thermal parameter and a threshold temperature value for the electronic device.

The invention claimed is:

1. An electronic device, comprising:
   circuitry configured to
   acquire charging parameters corresponding to a rechargeable battery of the electronic device;
   identify an operation state of one or more signal processing components of the electronic device;
   estimate a first temperature profile for the electronic device based on an operation state of the one or more signal processing components; and
   adjust, in multiple stages, a charging current of the rechargeable battery in response to the estimated first temperature profile and a threshold temperature for the electronic device.

2. The electronic device of claim 1, wherein the circuitry is further configured to notify a user that a temperature of the first temperature profile has exceeded the threshold temperature.

3. The electronic device of claim 2, wherein the circuitry is further configured to estimate a second temperature profile when an operation state of at least one of the signal processing components is changed to a lower heat generation state after the notification.

4. The electronic device of claim 3, wherein the circuitry is further configured to determine a revised charging current for the rechargeable battery based on the estimated second temperature profile.

5. The electronic device of claim 2, wherein the circuitry is further configured to notify the user to end operation of one of the signal processing components in operation.

6. The electronic device of claim 1, wherein the circuitry is further configured to change an operation state of one of the signal processing components to an operation which generates less heat when the estimated first temperature profile exceeds the threshold temperature.

7. The electronic device of claim 1, wherein the one or more signal processing components include one or more of a modem component, a WiFi component, a clock component, a thermistor component, a camera component, or a display component.

8. The electronic device of claim 1, wherein the circuitry is further configured to determine when the rechargeable battery needs to be charged based on charging current level data received from a battery monitor.

9. The electronic device of claim 1, further comprising an application manager.

10. The electronic device of claim 9, wherein the circuitry is further configured to estimate a change in temperature of the electronic device based on execution condition data from the application manager.

11. The electronic device of claim 10, wherein the circuitry is further configured to consider a working condition of the signal processing components, a running state of each application, and a charge condition of the rechargeable battery.

12. The electronic device of claim 11, wherein the circuitry is further configured to forward the estimated first temperature profile to the charge driver.

13. The electronic device of claim 3, wherein the circuitry is further configured to adjust a charging current to avoid exceeding the threshold temperature of the electronic device based on the estimated first or second temperature profiles.

14. The electronic device of claim 13, wherein the circuitry is further configured to close an application to avoid exceeding the threshold temperature.

15. The electronic device of claim 13, wherein the circuitry is further configured to lower the charging current to avoid exceeding the threshold temperature.

16. The electronic device of claim 13, wherein the circuitry is further configured to resume or increase the charging current when the estimated first or second temperature profiles fall below the threshold temperature.

17. The electronic device of claim 13, wherein the circuitry is further configured to determine when a quick charge is possible.

18. The electronic device of claim 13, wherein the charging current ranges from one to three amps.

* * * * *